United States Patent
Innes et al.

(10) Patent No.: US 6,219,146 B1
(45) Date of Patent: *Apr. 17, 2001

(54) LASER REFLECTOR ALIGNMENT

(75) Inventors: Robert Innes, Berkeley; William A. Eckes, Castro Valley, both of CA (US)

(73) Assignee: Etec Systems, Inc., Hayward, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,509

(22) Filed: Jul. 9, 1999

(51) Int. Cl.$^7$ .................................................. G01B 11/00
(52) U.S. Cl. ............................................................ 356/508
(58) Field of Search ................................... 356/363, 152, 356/153

(56) References Cited

U.S. PATENT DOCUMENTS

| | | |
|---|---|---|
| 3,844,660 | 10/1974 | Hunter . |
| 4,502,783 | * 3/1985 | Lau et al. .............................. 356/152 |
| 4,621,924 | 11/1986 | Williams . |
| 5,054,925 | * 10/1991 | Hunter ................................. 356/363 |
| 5,064,286 | * 11/1991 | Ai et al. ................................ 356/153 |
| 5,838,430 | 11/1998 | Slater et al. . |

FOREIGN PATENT DOCUMENTS

0388559A2    9/1990   (EP) .

OTHER PUBLICATIONS

Twyman Green Interferometer Available on Sep. 25, 2000 on the World Wide Web at http://www.laurin.com/datacenter/dictionary/CD/dt/twymarin.htm.
PCT/US00/17737; International Search Report; Jun. 27, 2000.

* cited by examiner

Primary Examiner—Frank G. Font
Assistant Examiner—Phi Natividao
(74) Attorney, Agent, or Firm—Skjerven Morrill Macpherson LLP; Ken Brooks

(57) ABSTRACT

A laser beam or other parallel light beam divides at a beamsplitter into sample and reference beams. The sample beam reflects from a reflective surface back to the beamsplitter, and the reference beam reflects from a retroreflector back to the beamsplitter. The beams are then directed into a telescope. The angle between sample and reference beams at the telescope is proportional to the angle between the laser beam and the normal to the reflective surface. The telescope collects both sample beam and reference beam and transforms each beam into a sharply defined point image. The lateral separation between the two point images is proportional to the magnification of the telescope and to the angle formed at the telescope between the sample beam and the reference beam. If the reflective surface is accurately aligned relative to the laser beam, then the two point images are substantially superposed on one another. Alignment is performed by adjusting the orientation of the reflective surface, until the lateral separation between the two point images reaches zero or a predetermined value.

29 Claims, 2 Drawing Sheets

LASER REFLECTOR ALIGNMENT

FIELD OF THE INVENTION

This invention relates to optical systems and particularly to an apparatus and method for accurate alignment of optically reflective surfaces relative to a beam of parallel light, usually a laser beam.

BACKGROUND

Many optical and mechanical systems require precise angular alignment. For example, equipment for electron beam and optical lithography includes moving stages in which the stage position is measured using interferometers that require precise alignment. Interferometric metrology is also used in precise machine tools. These and similar devices require mirrors carried on the moving stages to be aligned perpendicularly to a laser beam. Interferometers use other optical surfaces such as those of glass prisms which require accurate alignment. Using conventional methods, it is difficult to know accurately whether an interferometer axis is aligned, since its location in space depends on glass or mirror geometry and since it cannot readily be viewed in a manner that a laser beam is viewed. Misalignment of an interferometer can give rise to error terms of the first order in stage position and in first and second order in yaw and pitch, in accordance with conventional analysis.

A traditional method of aligning a reflective surface employs an autocollimator as an alignment tool. An autocollimator is configured basically as a telescope with a reticle, usually illuminated with a self contained light source. If an autocollimator is pointed at a distant flat mirror that is closely but not exactly perpendicular to the axis of the instrument, then an observer will observe through an eyepiece an image of the reticle that is slightly offset from the directly viewed reticle. When the reticle and its image superpose exactly, in focus, size and position, then light from the instrument is collimated and is perpendicular to the mirror. These devices are usually constructed to allow small angular displacements of the mirror to be measured, sometimes automatically. A disadvantage of an autocollimator is the requirement for an illuminated reticle, that must be precisely aligned with both the laser beam and the target reflector.

Another traditional instrument used for optical alignment is a sextant, which superposes the images of two objects, typically the sun and the horizon, for the purpose of measuring their apparent angular separation. Small motions of the instrument do not change the apparent relative positions of the objects. However, a sextant and similar devices depend on accurately movable mirrors and accurately calibrated circles, and generally cannot view sources located in opposite directions.

A traditional method recommended by metrological interferometer manufacturers to align mirrors and other reflective surfaces in a laser beam path is to place a white card at the laser output aperture with a hole in it just big enough to transmit the beam. The reflected beam from the mirror being aligned returns to the card, illuminating a visible spot on the surface of the card facing away from the laser. When the mirror is adjusted so that the spot appears centered on the hole, the mirror is perpendicular to the beam. This method suffers from several disadvantages: The laser beam may be several millimeters in diameter, making small errors hard to detect. The offset of the spot is twice the angular error of the mirror multiplied by the distance between the card and the mirror, which may be quite short, often less than a meter, and there may be little geometric magnification and no optical magnification of the error. The two spots being superposed may be large and are on opposite sides of the card. The hole in the card prevents the centers of the spots from being seen. The card is often not conveniently visible from the location where the adjustment is being made.

It is desirable in the art to provide a method and apparatus to determine accurately and simply whether optically reflective surfaces are in accurate alignment with a laser beam or similar parallel light beam. A null method is most desirable, which gives an unambiguous indication of accurate alignment independent of calibration, and in which any error of alignment is magnified. It is desirable that the accuracy not be degraded when the laser beam diameter is large. It is desirable that the apparatus not disturb the laser or system optics to be aligned and that removal of the apparatus from the system being aligned not disturb its alignment. These requirements do not preclude the apparatus being a permanent part of the system, nor do they preclude the apparatus providing a calibrated measurement of error, should any exist.

SUMMARY

An optical device, hereinafter called "the apparatus", and a method are provided for measuring the relative alignment of a laser or similar collimated light source with a mirror or other reflective surface and for providing a null indication if alignment is exact. In the description that follows, the laser-mirror configuration is referred to as "the system," and word "direction" implies a direction toward a point on the celestial sphere: all light rays parallel to one another have the same direction. "Counterparallel" implies directions toward two points on any great circle on the celestial sphere that are exactly 180 degrees apart.

The apparatus includes a beamsplitter, which divides the laser beam of the system into a sample beam and a reference beam. The sample beam is transmitted substantially undeflected in direction through the beamsplitter and is then reflected back to the beamsplitter from the optically reflective surface of the system to be aligned. The reference beam is reflected from the beamsplitter approximately at a right angle to the laser beam and is then reflected in a counterparallel direction from a retroreflector in the apparatus back to the beamsplitter. The sample beam from the reflective surface is then partially reflected from the beamsplitter toward a telescope. The reference beam from the retroreflector is partially transmitted undeflected in direction through the beamsplitter toward the telescope. The telescope is the third principal optical component of the apparatus, but is not necessarily physically attached to other components. The angle between the sample and reference beams at the telescope is proportional to the orientation angle between the laser beam and the normal to the reflective surface.

The telescope collects both the sample and reference beams and transforms each beam into a point image (or 'star'). The apparent angular separation between the two point images produced by the telescope is equal to twice the product of the telescope magnification times the angle formed between the mirror normal and the laser beam, independent of the distance to the mirror. If the reflective surface is accurately aligned relative to the laser beam, then the two point images or stars are superposed on one another. If viewed directly by eye, the laser beam is preferably attenuated using optical filters to prevent eye injury. Alternatively, for direct eye viewing, the beamsplitter mirror can be nearly completely reflective, transmitting only a small fraction of light.

The point images can be projected onto a viewing screen or into an suitable image detecting device, thereby providing an output signal in response to the lateral separation between the point images. In some embodiments, the output signal provides feedback to an actuator, which maintains perpendicularity of the laser beam and the reflective surface within a desired tolerance. Ideally, the beamsplitter in the apparatus is inclined at a 45-degree angle relative to the laser beam of the system, but deviations in this angle do not affect the relative positions of the two stars. If the stars superpose, becoming a single star, the system is in alignment.

The apparatus does not require that the laser beam and reflective surface each be aligned with respect to the apparatus to insure their correct alignment relative to one another. If the apparatus is an integral part of the laser-reflector system, for example an interferometer, another embodiment is possible in which the configurations of the sample and reference beams are reversed. A reflective surface, for example a stage mirror, commonly requires a beam at a right angle or some other angle not parallel with the laser beam. In such configurations, an auxiliary mirror is used, which can be the beamsplitter of the apparatus. The retroreflector is in line with the laser beam. In this configuration, the apparatus monitors the perpendicularity of the beam reflected in the stage mirror, which requires stability of the beamsplitter not as part of the apparatus but as part of the interferometer system.

A beam expander, collimator and/or attenuator can be positioned in the laser beam ahead of the beamsplitter to improve the system or apparatus performance.

The present invention is better understood upon consideration of the detailed description below, in conjunction with the accompanying drawings.

BRIEF DESCRIPTION OF THE DRAWINGS

The present invention may be better understood, and its numerous objects, features, and advantages made apparent to those skilled in the art by referencing the accompanying drawing.

DETAILED DESCRIPTION OF THE EMBODIMENTS

The following is a detailed description of illustrative embodiments of the present invention. As these embodiments of the present invention are described with reference to the aforementioned drawings, various modifications or adaptations of the methods and or specific structures described may become apparent. These descriptions and drawings are not to be considered in a limiting sense as it is understood that the present invention is in no way limited to the embodiments illustrated.

Figure 1:
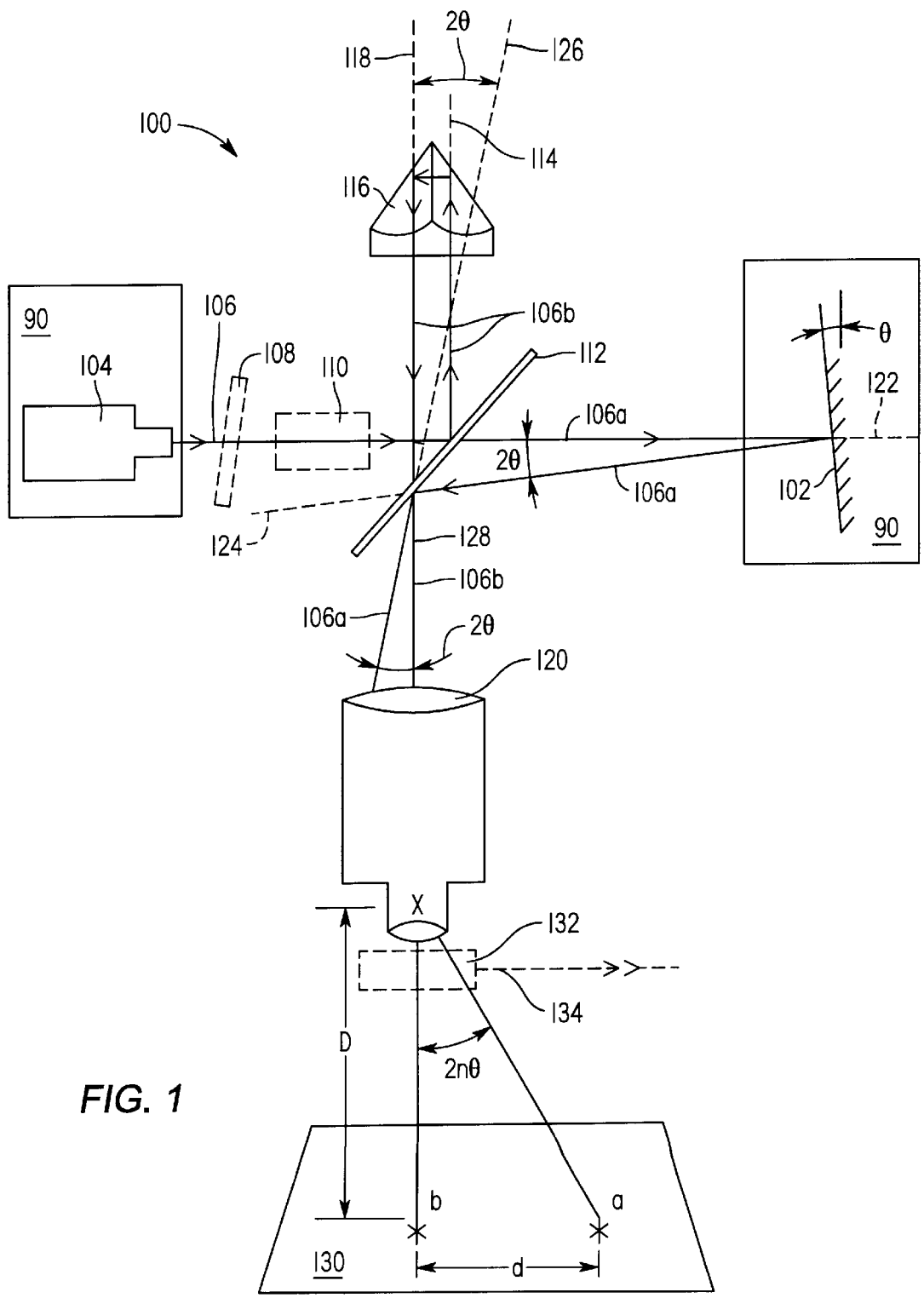
FIG. 1 is a plan view of an apparatus configured for aligning an optically reflective surface with a laser beam, in accordance with the invention.

FIG. 1 is a plan view of an apparatus 100 configured for aligning an optically reflective surface 102 with a laser beam 106, in accordance with the invention. Surface 102 is e.g., a mirror mounted on an x-y stage for interferometry. Laser 104 is configured to provide a laser output beam 106 directed to illuminate reflective surface 102. Laser 104 and reflective surface 102 are typically components of an interferometric system 90. Reflective surface 102 can be integral with or attached to a mechanical component (not shown), such as rails or a stage, of system 90. Apparatus 100 includes an optional optical quality attenuator 108 (shown shaded in FIG. 1), typically proximate to laser 104 and disposed to intercept a portion of the energy of laser beam 106, and an optional collimator 110 (shaded in FIG. 1), also typically positioned in laser beam 106 proximate to laser 104. Apparatus 100 includes a beamspitter 112 and a retroreflector 116. Beamsplitter 112 is disposed in laser beam 106 to transmit a beam portion 106a of laser beam 106 along a beam axis 122 to illuminate a region of reflective surface 102, which reflects beam portion 106a back along a beam axis 124 onto beamsplitter 112, which then partially reflects beam portion 106a along a reflected beam axis 126. Beamsplitter 112 is disposed to reflect a beam portion 106b of laser beam 106 along a beam axis 114 onto a retroreflector 116, which redirects beam portion 106b along an offset beam axis 118 that is aligned accurately counterparallel to beam axis 114. Offset beam portion 106b is then partially transmitted through beamsplitter 112 along a transmitted beam axis 128. A telescope 120 having a magnification n (alternatively a conventional surveyor's theodolite instrument for measuring angular separations) is disposed to collect beam portions 106a and 106b propagating along respective beam axes 126 and 128. Telescope 120 can be but need not be integral with apparatus 100.

In operation, laser beam 106 is provided by laser 104, typically a commercially available low power laser, as described in more detail in an example below. Typically, laser 104 is incorporated into a system that includes reflective surface 102. Laser beam 106 is attenuated by optional attenuator 108, typically by reflection from the first surface of a commercially available conventional optical filter. Attenuator 108 increases user eye protection, reduces the brightness of potentially troublesome "ghost" images in the telescope, and is oriented to prevent reflected laser light from reentering the laser. If not needed for eye protection, for example if laser power is low, attenuator 108 is optional. Alternatively, for direct eye viewing, beamsplitter 112 can be nearly completely reflective, transmitting only a small fraction of light. In some applications, attenuation may be desirable to minimize reentry into the laser of light reflected from various surfaces in the optical path, which can otherwise degrade laser performance. Rotation of the optical filter about the beam axis tests for undesirable deflecting of laser beam 106 by a wedged filter.

Optional collimator 110 expands the width of laser beam 106 to fill a larger optical aperture system if required, and can be used if needed to adjust the parallelism of the laser beam. Commercially available collimators, typically configured as inverted telescopes, include two or more lenses that are disposed concentrically about an optical axis and adjustably separated from one another along an optic axis. An incident beam along the optic axis is expanded in width and is rendered substantially parallel, i.e., neither converging nor diverging, by adjusting the axial separation between the collimator lenses. Laser beam 106 as defined herein refers as well to other beams of parallel light, e.g., light from a distant star (not shown). Due regard for any errors that attenuators and collimators potentially introduce will be evident to those skilled in the optical arts.

After laser beam 106 propagates through optional attenuator 108 and optional collimator 110 to beamsplitter 112, beam portion 106a (i.e., the sample beam) is transmitted through beamsplitter 112 along beam axis 122 and beam portion 106b (i.e., the reference beam) is reflected from beamsplitter 112 along beam axis 114. The performance of alignment apparatus 100 is substantially insensitive to the orientation of beamsplitter 112 relative to laser beam 106. However, it is generally convenient to orient beamsplitter 112 at an angle of approximately 45 degrees relative to laser beam 106. Reflected beam portion 106b propagates along beam axis 114 onto retroreflector 116. Commercially available retroreflectors, as described in more detail in an example below, have a property of returning a reflected beam offset from but substantially counterparallel with a corresponding incident beam, independent of the detailed alignment of the retroreflector relative to the incident beam over a wide range of angles of incidence. Retroreflectors are typically prisms incorporating three mirror surfaces that form the inside corner of a cube. A ray of light entering a retroreflector exits counterparallel to its entrance path with an offset that depends on its distance from the corner. Thus, retroreflector 116 reflects beam portion 106b along a beam axis 118 that is offset from but accurately counterparallel with beam axis 114. Beam portion 106b then propagates along beam axis 118 to beamsplitter 112, where it is then partially transmitted along beam axis 128 into the collecting aperture of telescope 120. Provided that beamsplitter 112 is not wedged, beam axis 128 is substantially parallel to beam axis 118.

Beam portion 106a of laser beam 106 is transmitted through beamsplitter 112 and is reflected from reflective surface 102, oriented at an angle $\vartheta$ relative to a plane perpendicular to beam axis 122. In accordance with well known principles of optical reflection, beam portion 106a is reflected from reflective surface 102 along beam axis 124 oriented at an angle $2\vartheta$, relative to beam axis 122. Beam portion 106a then propagates along a beam axis 124 to beamsplitter 112, where it is then partially reflected along a beam axis 126 into the collecting aperture of telescope 120. Those skilled in the art will appreciate that, provided beamsplitter 112 is not wedged, beam axis 126 (sample beam 106a) is likewise oriented at angle $2\vartheta$ relative to beam axis 128 (reference beam 106b) at the collecting aperture of telescope 120. Telescope 120 exhibits the traditional telescopic property of transforming input angles into output angular displacements. Thereby, telescope 120 displays an output of two sharply defined, substantially diffraction-limited point images (shown schematically in FIG. 1 as "stars" *a and *b), having a relative angular displacement $2n\vartheta$ proportional to the product of telescope magnification n times the angle $2\vartheta$ formed between beam axes 126 and 128 at the input of telescope 120. In view of the foregoing discussion, angular displacement $2n\vartheta$ is in turn proportional to orientation angle $\vartheta$ of reflective surface 102 relative to laser beam 106. In some embodiments, as shown in FIG. 1, point images *a and *b are projected by telescope 120 onto a viewing surface 130, positioned at a distance D from the eyepiece of telescope 120, such that the lateral separation d between point images *a and *b equals approximately $2n\vartheta D$. Viewing surface 130 is, for example, ground glass, ceramic, paper, a distant wall or ceiling, or other diffusely reflective material.

In particular, if reflective surface 102 is accurately aligned perpendicular to laser beam 106 (i.e., $\vartheta=0$), then there is zero angular displacement $2n\vartheta$ and zero lateral displacement d between respective point images *a and *b of sample beam portion 106a and reference beam portion 106b, whereby the respective point images *a and *b superpose substantially on one another. In some embodiments, point images *a and *b are viewed directly through the eyepiece of telescope 120 by a human observer (not shown), and/or are projected through telescope 120 onto an optional image detecting device 132 (e.g., video camera or photodetector array, shown shaded in FIG. 1). Optional image detecting device 132 can generate a signal at an output terminal 134 that provides, for example, an encoded image and/or an error signal in response to lateral displacement d to drive an actuator or motorized stage (not shown). In some embodiments, the output signal provides feedback to an actuator, which maintains perpendicularity between laser beam 106 and reflective surface 102 within a desired tolerance, either by adjusting the laser or the reflective surface or by adjusting some intermediate mirror or equivalent optical element, such as a split wedge. Due regard for eye protection is important in case of potential eye exposure to directly viewed or projected point images *a and *b.

To align reflective surface 102 relative to laser beam 106 in system 90, mechanical orientation adjustments are performed, until point images *a and *b superpose on one another. Particularly, if telescope 120 is a theodolite, then the angular separation of sample beam 106a relative to reference beam 106b is accurately measurable. The performance of apparatus 100 is insensitive to optical misalignment of internal components (e.g., beamsplitter 112 and retroreflector 116) relative to laser beam 106 and telescope 120. The offset between entrance beam axis 114 and exit beam axis 118 at retroreflector 116 produces no adverse effect on performance, as long as the collecting aperture of telescope 120 is large enough to collect substantially all rays exiting the retroreflector.

The apparatus does not require that the laser beam and reflective surface each be aligned with respect to the apparatus to insure their correct alignment relative to one another. The apparatus is typically temporarily interposed in the laser beam between the laser and the reflective surface in question and provides an indication of the error of alignment. This indication is insensitive to the alignment of the apparatus itself in the optical path. If the laser-mirror alignment is found to be accurate, the indication is null in that two point images are seen to superpose, which does not require the measurement of a calibrated quantity. The apparatus can be designed so that any error in alignment is arbitrarily magnified within the limits of the resolving power of its optics.

If the apparatus is tilted, the position of the superposed star as seen through the telescope will change; if the star is projected onto a screen, tilting the apparatus will move the star on the screen, but the two star images will remain superposed. The criterion of accurate alignment of the system is superposition of the stars, not their apparent detailed location as projected on a screen or as viewed through a telescope. Projecting point images *a and *b onto a screen facilitates the task of an operator in performing adjustments, provided that the operator can see the image on the screen while performing the adjustments. The apparatus described above provides a simple, robust, and accurate tool for performing and verifying optical alignment. The extent of misalignment is readily apparent, since point images *a and *b are sharply defined "stars" rather than diffuse disks, as in traditional optical alignment systems.

If apparatus 100 is an integral part of laser-reflector system 90, for example an interferometer, another embodiment is possible in which the locations of the sample and reference beams are reversed. Reflective surface 102, for example a stage mirror, commonly requires a laser beam at a right angle or some other angle not parallel with original laser beam 106. In such configurations, an auxiliary mirror is used, which can be beamsplitter 112 of the apparatus.

Retroreflector 116 is in line with laser beam 106. Thus, the respective positions of reflecting surface 102 and retroreflector 116 are reversed, thereby also reversing the respective locations of sample beam 106a and reference beam 106b. In this configuration, apparatus 100 monitors the perpendicularity of the beam reflected by stage mirror 102, which requires stability of beamsplitter 116 not as part of apparatus 100 but as part of system 90.

Thick beamsplitters with no wedge will not cause multiple images. Those skilled in optical arts will appreciate the consequences of wedge in such beamsplitters, both with respect to refraction and multiple reflection in affecting desired performance. Antireflection coatings on one surface effective at the wavelength and angle of the beamsplitter can be adequate to suppress multiple reflections. To avoid the complexities of wedged beamsplitters, it is sometimes desirable to use a pellicle as a beamsplitter. In general, a pellicle, which is conventional in the art, consists of a thin semi-transparent membrane stretched over a substantially annular frame and configured such that the reflections from its two mutually parallel faces are substantially coincident or such that the reflection from one face is enhanced relative to the other surface.

An important test in using apparatus 100 is to rotate it about laser beam 106. If the apparatus has internal errors due to wedge or retroprism error that cancel the laser-mirror alignment error in one orientation, this cancellation will generally not occur identically at all rotational orientations. Conversely, if apparatus 100 indicates alignment within a tolerance for all orientations, then the apparatus errors are within the same tolerance.

As an example, an embodiment of the invention has been assembled and demonstrated. In this example, laser 104 is a Model No. 10706A HeNe laser supplied by the Hewlett Packard Company, Palo Alto, Calif., operating at a wavelength of approximately 633 nm and having an output power of approximately 250 $\mu$W. Alternatively, a laser having other material composition, operating wavelength, and/or output power can be used. Attenuator 108 is a Model 02WLQ 305 neutral density filter supplied by Melles Griot, 16542 Millikan Avenue, Irvine, Calif. 92606, having an optical density of 6.0. Beamsplitter 112 is a Model 03BPL 001 03 pellicle, and retroreflector 116 is a Model 02CCG 001/011/066, both also from Melles Griot. Telescope 120 is a Model G6010 (30,819) having 24× magnification, supplied by Edmund Scientific, 101 East Gloucester Pike, Barrington, N.J. 08007-1380.

Figure 2:
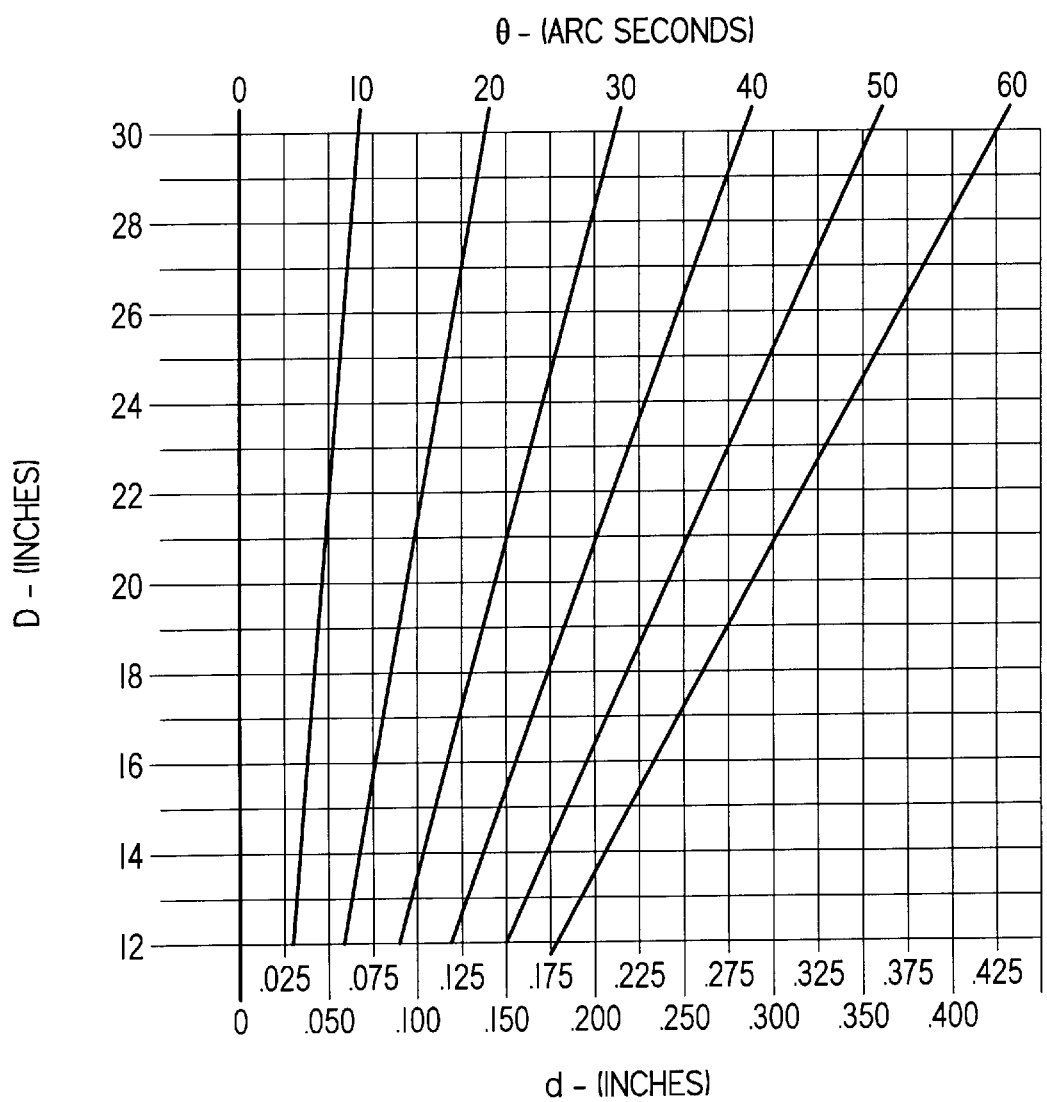
FIG. 2 is a graphical representation of the measured performance obtained, using an embodiment of the present invention.

FIG. 2 is a graphical representation of the measured performance obtained, using the above-described embodiment. The lateral displacement d in inches between point images *a and *b projected by telescope 120 onto a screen 130 was measured as a function of the variables of distance D in inches of screen 130 from the eyepiece of telescope 120 and orientation angle $\vartheta$ in arc-seconds between the normal to reflective surface 102 and laser beam 106. The vertical axis of FIG. 2 shows distance D in inches, and the horizontal axis shows lateral displacement d in inches. The diagonal lines show the measured dependence of displacement d on distance D for various values of $\vartheta$ in increments of 10 arc-seconds from zero to 60 arc-seconds. The data agree closely with predictions and fit an approximate empirical relationship:

$$\vartheta(\text{arc-seconds}) \cong (4350 \times d(\text{inches}))/(D(\text{inches})+1).$$

Embodiments of the present invention differ from autocollimators, in that the former do not require the system consisting of a laser and a reflective surface be aligned preferentially with respect to the apparatus, whereas an autocollimator measures the misalignment of a mirror with respect to the autocollimator. The autocollimator constructs two images of an internal object, one seen directly and the other reflected in the mirror. The present apparatus has no internal object such as an illuminated reticle to be imaged, but uses a retroreflector to superpose two desirably counterparallel light beams. Unlike a sextant, which depends on accurately movable mirrors and accurately calibrated circles and which cannot as usually configured view sources in opposite directions, the apparatus according to the present invention has no moving parts, has no calibrated circle, and does not depend on accurate positioning or orientation of either beamsplitter or retroreflector.

Apparatus 100 can equally be used to test the counterparallelism of any two essentially parallel light beams, not necessarily those derived from a laser and its reflection in a mirror. For example, apparatus 100 can be used in surveying to determine that two distant points are in exactly opposite directions from the apparatus, hence establishing that the apparatus is located on a straight line between the two distant points.

While embodiments of the present invention have been shown and described, changes and modifications to these illustrative embodiments can be made without departing from the present invention in its broader aspects. Thus it should be evident that there are other embodiments of this invention which, while not expressly described above, are within the scope of the present invention. Therefore, it will be understood that the appended claims necessarily encompass all such changes and modifications as fall within the described invention's true scope; and further that this scope is not limited merely to the illustrative embodiments presented to demonstrate that scope.

What is claimed is:

1. An apparatus for alignment of an optically reflective surface with a light beam, comprising:
   a beamsplitter disposed in said light beam, said beamsplitter spaced-apart from said optically reflective surface, said beamsplitter configured to divide said light beam into a first beam portion propagating in a first direction and a second beam portion propagating in a second direction differing from said first direction, said first beam portion being reflected from said optically reflective surface onto said beamsplitter;
   a retro-reflector disposed in said second beam portion, said retro-reflector reflecting said second beam portion onto said beamsplitter in a direction counterparallel to said second direction; and
   a telescope disposed to collect said first beam portion and said second beam portion after reflection respectively at said optically reflective surface and said retro-reflector, and image said first and second beam portions onto a target plane as two point images.

2. The apparatus of claim 1, wherein said beamsplitter is oriented to transmit said first beam portion in said first direction and to reflect said second beam portion in said second direction.

3. The apparatus of claim 2, wherein said beamsplitter is disposed to partially reflect said first beam portion between said optically reflective surface and said telescope and to partially transmit said second beam portion between said retroreflector and said telescope.

4. The apparatus of claim 1, wherein said beamsplitter is oriented to reflect said first beam portion in said first direction and to transmit said second beam portion in said second direction.

5. The apparatus of claim 4, wherein said beamsplitter is disposed to partially transmit said first beam portion between said optically reflective surface and said telescope and to partially reflect said second beam portion between said retroreflector and said telescope.

6. The apparatus of claim 1, further comprising an optical attenuator disposed in said light beam.

7. The apparatus of claim 6, wherein said optical attenuator is oriented to minimize retroreflection of said light beam.

8. The apparatus of claim 1, further comprising a collimator disposed in said light beam.

9. The apparatus of claim 2, wherein said first direction is substantially parallel to said light beam.

10. A method of aligning an optically reflective surface, in optical communication with a beamsplitter, with a light beam, comprising:

impinging a light beam onto said beamsplitter;

dividing, with said beamsplitter, said light beam into a sample beam in a first direction and a reference beam in a second direction differing from said first direction;

reflecting said sample beam from said optically reflective surface;

retro-reflecting said reference beam, whereby said reference beam after said retro-reflection propagates in a direction counterparallel to said second direction; and collecting and imaging both said sample beam and said reference beam after respectively reflecting from said optically reflective surface and said retro-reflecting, whereby said imaging produces a sharply defined point image for each of said sample beam and said reference beam, said point images having a lateral separation proportional to an angle between said sample beam and said reference beam.

11. The method of claim 10, wherein said point images are viewed by a human observer.

12. The method of claim 10, wherein said point images are projected onto a viewing surface.

13. The method of claim 10, further comprising:

projecting said point images onto an image detecting device; and generating an output signal in response to said lateral separation between said point images.

14. The method of claim 10, wherein adjusting said angle comprises adjusting the orientation of said optically reflective surface relative to said light beam.

15. The method of claim 10, wherein said predetermined separation is zero, whereby said point images substantially superpose on one another.

16. The method of claim 10, wherein said light beam is divided by a beamsplitter into a transmitted sample beam in said first direction and a reflected reference beam in said second direction.

17. The method of claim 16, wherein said beamsplitter partially reflects said sample beam after said reflecting from said optically reflective surface and before said collecting and partially transmits said reference beam after said retroreflecting and before said collecting.

18. The method of claim 10, wherein said light beam is divided by a beamsplitter into a reflected sample beam in said first direction and a transmitted reference beam in said second direction.

19. The method of claim 18, wherein said beamsplitter partially transmits said sample beam after said reflecting from said optically reflective surface and before said collecting and partially reflects said reference beam after said retroreflecting and before said collecting.

20. The method of claim 10, further comprising the act of attenuating said light beam before said dividing of said light beam into said sample beam and said reference beam.

21. The method of claim 10, wherein said light beam is a laser beam.

22. The method of claim 16, wherein said first direction is substantially parallel to said light beam.

23. An apparatus for alignment of an optically reflective surface, said apparatus comprising:

a source of a beam;

an optical system in optical communication with both said source and said optically reflective surface, to image said beam as a pair of illuminated regions separated by a distance, d, with said distance, d, being a function of angular rotation of said optically reflective surface.

24. The apparatus as recited in claim 23 wherein said optical system includes a beamsplitter, a retro-reflector and an optical train, with said beamsplitter being disposed in a path of said beam and said retro-reflector being and said optical train being in optical communication with said beamsplitter.

25. The apparatus as recited in claim 23 wherein said optical system includes a beamsplitter, a retro-reflector and an optical train, with said beamsplitter being disposed in a path of said beam and said retro-reflector being disposed opposite to said optical train with said beamsplitter being disposed therebetween.

26. The apparatus as recited in claim 23 wherein said optical system includes a beamsplitter, a retro-reflector and an optical train, with said beamsplitter being disposed in a path of said beam and said retro-reflector being disposed opposite to said source and said optical train being disposed opposite to said optically reflective surface with said beamsplitter being disposed therebetween.

27. The apparatus as recited in claim 24 wherein said optical train defines a telescope.

28. The apparatus as recited in claim 24 wherein said beam is disposed to have said light beam impinge thereupon at an angle of incidence, with said angle of incidence being fixed.

29. The apparatus as recited in claim 24 wherein said beamsplitter is configured to divide said beam into a first beam portion propagating in a first direction and a second beam portion propagating in a second direction differing from said first direction, said first beam portion being reflected from said optically reflective surface onto said beamsplitter, with said retro-reflector being disposed in said second beam portion, said retro-reflector reflecting said second beam portion onto said beamsplitter in a direction counterparallel to said second direction, with said optical train being disposed to collect said first beam portion and said second beam portion after reflection respectively at said optically reflective surface and said retro-reflector.

* * * * *